(12) United States Patent
Wu et al.

(10) Patent No.: US 11,477,764 B2
(45) Date of Patent: Oct. 18, 2022

(54) TRANSMITTING SYSTEM INFORMATION ON SIDELINK

(71) Applicant: QUALCOMM Incorporated, San Diego, CA (US)

(72) Inventors: Shuanshuan Wu, San Diego, CA (US); Kapil Gulati, Hillsborough, NJ (US); Sudhir Kumar Baghel, Hillsborough, NJ (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/943,893

(22) Filed: Jul. 30, 2020

(65) Prior Publication Data

US 2021/0037513 A1 Feb. 4, 2021

Related U.S. Application Data

(60) Provisional application No. 62/880,964, filed on Jul. 31, 2019.

(51) Int. Cl.
*H04W 72/04* (2009.01)
*H04W 72/00* (2009.01)
*H04W 92/18* (2009.01)

(52) U.S. Cl.
CPC ..... *H04W 72/0406* (2013.01); *H04W 72/005* (2013.01); *H04W 72/044* (2013.01); *H04W 92/18* (2013.01)

(58) Field of Classification Search
CPC ... H04W 72/044; H04W 76/14; H04W 48/12; H04W 72/005; H04W 72/0406; H04W 92/18
See application file for complete search history.

(56) References Cited

U.S. PATENT DOCUMENTS

| | | | |
|---|---|---|---|
| 2019/0053305 A1* | 2/2019 | Saiwai | H04W 76/11 |
| 2019/0313260 A1* | 10/2019 | Zhang | H04W 48/12 |
| 2021/0297221 A1* | 9/2021 | Lee | H04L 1/1812 |

OTHER PUBLICATIONS

Share Technote, "LTE Basic Procedure: SIB Scheduling" Feb. 9, 2012, https://www.sharetechnote.com/html/BasicProcedure_LTE_SIB_Scheduling.html (Year: 2012).*

(Continued)

*Primary Examiner* — Maharishi V Khirodhar
*Assistant Examiner* — Kenneth P Hunt
(74) *Attorney, Agent, or Firm* — Patterson + Sheridan, LLP

(57) ABSTRACT

Certain aspects of the present disclosure provide techniques for transmitting system information on sidelink. A method that may be performed by a first user equipment (UE) includes receiving first system information from a second UE; determining, based on one or more first parameters, to receive second system information from the second UE; receiving the second system information in a sidelink system information block (S-SIB) from the second UE; and communicating with the second UE via sidelink resources determined based on the first system information and the second system information.

32 Claims, 12 Drawing Sheets

(56) References Cited

OTHER PUBLICATIONS

CATT: "Considerations on Synchronization Mechanism in NR V2X", 3GPP Draft, 3GPP TSG RAN WG1 Meeting #94, R1-1808401, 3rd Generation Partnership Project (3GPP), Mobile Competence Centre, 650, Route Des Lucioles, F-06921, Sophia-Antipolis Cedex, France, vol. Ran WG1, No. Gothenburg, Sweden; Aug. 19, 2018-Aug. 24, 2018, Aug. 11, 2018 (Aug. 11, 2018), XP051515783, 4 pages.
International Search Report and Written Opinion—PCT/US2020/044580—ISA/EPO—dated Oct. 22, 2020.
SHARP: "Considerations on Synchronization Design for NR V2X", 3GPP Draft, 3GPP TSG RAN WG1 Ad-Hoc Meeting 1901, R1-1900832, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593678, 4 pages, Paragraph "2.4.PSBCH contents".
Spreadtrum Communications: "Discussion on Synchronization Mechanism for NR V2X", 3GPP Draft, 3GPP TSG RAN WG1 Meeting #97, R1-1906364, Discussion on Synchronization Mechanism for NR V2X, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727814,10 pages, 10 pages, Paragraph "2.4 SL-MIB contents", p. 2. last paragraph p. 6, lines 7-10.

\* cited by examiner

TRANSMITTING SYSTEM INFORMATION ON SIDELINK

CROSS-REFERENCE TO RELATED APPLICATIONS

This application claims benefit of and priority to U.S. Provisional Patent Application No. 62/880,964, filed Jul. 31, 2019, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for transmitting system information of a network on a sidelink from a first user equipment (UE) to a second UE.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communications among user equipments when one UE is outside of coverage of a network.

Certain aspects provide a method for wireless communication performed by a first user equipment (UE). The method generally includes receiving first system information from a second UE; determining, based on one or more first parameters, to receive second system information from the second UE; receiving the second system information in a sidelink system information block (S-SIB) from the second UE; and communicating with the second UE via sidelink resources determined based on the first system information and the second system information.

Certain aspects provide a method for wireless communication performed by a first user equipment (UE). The method generally includes transmitting first system information to a second UE; determining, based on one or more first parameters, to transmit second system information to the second UE; transmitting the second system information in a sidelink system information block (S-SIB) to the second UE; and communicating with the second UE via sidelink resources determined based on the first system information and the second system information.

Certain aspects provide a first apparatus for wireless communication. The first apparatus includes a processor configured to receive first system information from a user equipment (UE); determine, based on one or more first parameters, to receive second system information from the UE; receive the second system information in a sidelink system information block (S-SIB) from the UE; and communicate with the UE using sidelink resources determined based on the first system information and the second system information; and a memory coupled with the processor.

Certain aspects provide a first apparatus for wireless communication. The first apparatus includes a processor configured to transmit first system information to a user equipment (UE); determine, based on one or more first parameters, to transmit second system information to the UE; transmit the second system information in a sidelink system information block (S-SIB) to the UE; and communicate with the UE via sidelink resources determined based on the first system information and the second system information; and a memory coupled with the processor.

Certain aspects provide an apparatus for wireless communication. The apparatus includes means for receiving first system information from a user equipment (UE) and means for determining, based on one or more first parameters, to receive second system information from the UE. The apparatus further includes means for receiving the second system information in a sidelink system information block (S-SIB) from the UE; and means for communicating with the UE using sidelink resources determined based on the first system information and the second system information.

Certain aspects provide an apparatus for wireless communication. The apparatus includes means for transmitting first system information to a user equipment (UE) and means for determining, based on one or more first parameters, to transmit second system information to the UE. The apparatus further includes means for transmitting the second system information in a sidelink system information block (S-SIB) to the UE; and means for communicating with the UE via sidelink resources determined based on the first system information and the second system information.

Certain aspects provide a computer readable medium containing program instructions for causing a computer to perform operations including: receiving first system information from a user equipment (UE); determining, based on one or more first parameters, to receive second system information from the UE; receiving the second system information in a sidelink system information block (S-SIB) from the UE; and communicating with the UE via sidelink resources determined based on the first system information and the second system information.

Certain aspects provide a computer readable medium containing program instructions for causing a computer to perform operations including: transmitting first system information to a user equipment (UE); determining, based on one or more first parameters, to transmit second system information to the UE; transmitting the second system information in a sidelink system information block (S-SIB) to the UE; and communicating with the UE via sidelink resources determined based on the first system information and the second system information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
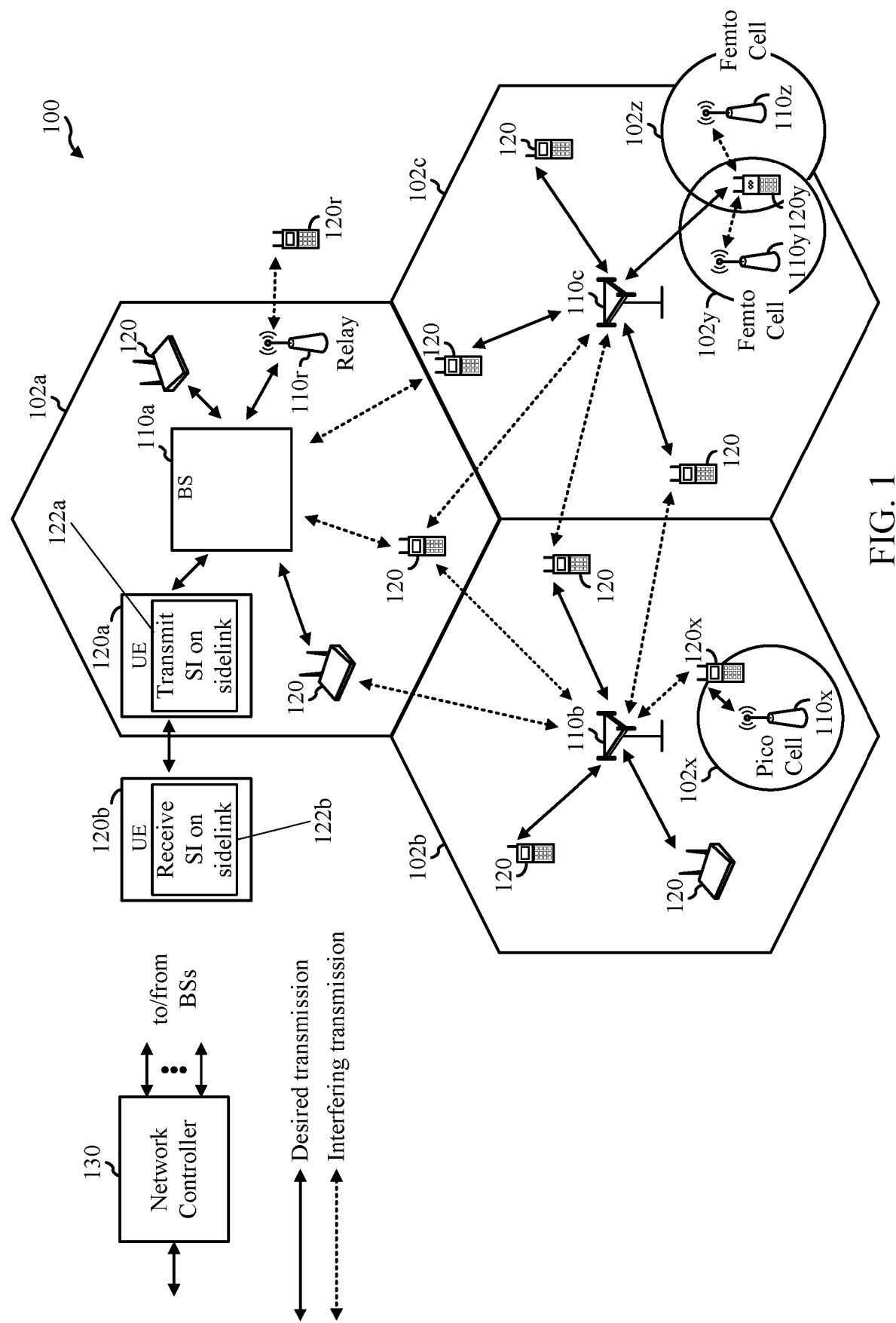
FIG. 1 is a block diagram conceptually illustrating an example telecommunications system, in accordance with certain aspects of the present disclosure.

Aspects of the present disclosure provide apparatus, methods, processing systems, and computer readable mediums for transmitting system information on sidelinks for sidelink operations by user equipments (UEs). In previously known wireless communications systems, most of the necessary configurations for sidelink (e.g., vehicle-to-anything (V2X) or device-to-device (D2D)) communications may be configured on UEs by a next generation NodeB (gNB) or pre-configured in the UEs. These configurations may include subcarrier spacing (SCS), bandwidth, channelization, and/or a time-division duplex (TDD) configuration. If a UE does not receive the configurations from the gNB, then the UE may receive some of the configurations in a physical sidelink broadcast channel (PSBCH) transmitted by another UE, which carries a sidelink master information block (MIB) that may also convey, for example, a frame number of the communication system. Still, the information in a sidelink MIB (S-MIB) may not be sufficient for a UE to start transmitting or receiving on sidelink in certain scenarios. For example, when sidelink transmissions are configured to share licensed spectrum with cellular links (e.g., downlink transmissions from a base station or uplink transmissions to a base station), the resources (e.g., time slots and/or frequency bands) available to sidelink transmissions need to be known to UEs, so UEs know when and on what frequencies to receive or transmit on sidelink(s), and sidelink communications will not interfere with cellular communications. Such resource configurations can be done by a gNB; but in some cases a UE is unable to get the sidelink configuration directly from gNB. In one example, a first UE out of coverage (OoC) of a gNB that desires to communicate with a second UE that is in coverage (InC) of the gNB can't receive sidelink resource configurations from the gNB because the first UE is OoC. In another example, a first UE that is InC of a first gNB, gNB1. desires to communicate with a second UE that is InC of a second gNB, gNB2, and the two gNBs may have different sidelink configurations, so the first UE cannot communicate with the second UE via a sidelink without the first UE obtaining the sidelink configuration from gNB2.

According to aspects of the present disclosure, techniques for conveying configuration information for sidelink (SL) communications via a sidelink are provided. The configurations may include, for example, TDD uplink/downlink configuration, SL resource pool configuration, and sidelink bandwidth part (BWP) configuration.

The following description provides examples of conveying system information (SI) in sidelink communications in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

In aspects of the present disclosure, UE 120a, which is in coverage of BS 110a in cell 102a, may transmit system information on a sidelink to UE 120b, which is out of coverage of the cell 102a. UE 120a may use a system information (SI) on sidelink module to determine whether to transmit SI on a sidelink to UE 120b and to transmit the SI on the sidelink to UE 120b. Similarly, UE 120b may use an SI on sidelink module to determine whether to attempt to receive SI on a sidelink from UE 120a and to attempt to receive the SI on the sidelink from 120b.

According to certain aspects, the UEs 120 may be configured for transmitting and receiving SI on sidelink. As shown in FIG. 1, the UE 120a includes a transmit SI on sidelink manager 122a. The transmit SI on sidelink manager 122a may be configured to transmit first system information to a second UE (e.g., UE 120b); to determine, based on one or more first parameters, to transmit second system information to the second UE; to transmit the second system information in a sidelink system information block (S-SIB) to the second UE; and to communicate with the second UE via sidelink resources determined based on the first system information and the second system information, in accordance with aspects of the present disclosure. Also as shown in FIG. 1, the UE 120b includes a receive SI on sidelink manager 122b. The receive SI on sidelink manager 122b may be configured to receive first system information from a second UE; to determine, based on one or more first parameters, to receive second system information from the second UE; to receive the second system information in a sidelink system information block (S-SIB) from the second UE; and to communicate with the second UE via sidelink resources determined based on the first system information and the second system information, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
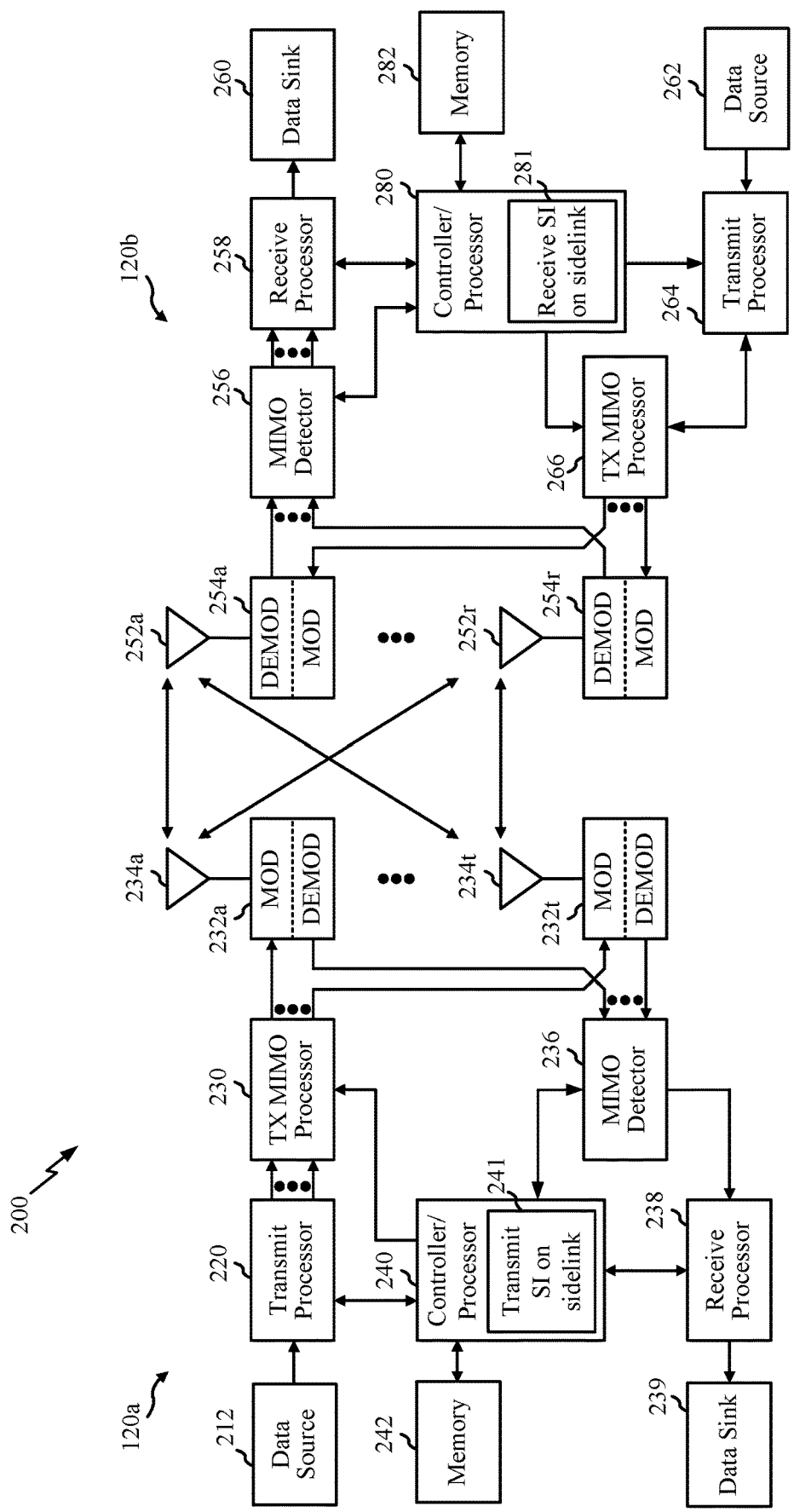
FIG. 2 is a block diagram conceptually illustrating a design of an example a base station (BS) and user equipment (UE), in accordance with certain aspects of the present disclosure.

FIG. 2 illustrates example components of UE 120a and UE 120b (e.g., in the wireless communication network 100 of FIG. 1), which may be used to implement aspects of the present disclosure.

At the UE 110a, a transmit processor 220 may receive data from a data source 212 and control information from a controller/processor 240. The control information may be for the physical sidelink broadcast channel (PSBCH) or physical sidelink control channel (PSCCH), physical uplink control channel (PUCCH), etc. The data may be for the physical sidelink shared channel (PSSCH), physical uplink shared channel (PUSCH), etc. The processor 220 may process (e.g., encode and symbol map) the data and control information to obtain data symbols and control symbols, respectively. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream to obtain an output sample stream. Each modulator may further process (e.g., convert to analog, amplify, filter, and upconvert) the output sample stream to obtain an uplink or sidelink signal. Uplink or sidelink signals from modulators 232a-232t may be transmitted via the antennas 234a-234t, respectively.

At the UE 120b, the antennas 252a-252r may receive the sidelink signals from the UE 120a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120b to a data sink 260, and provide decoded control information to a controller/processor 280.

On the uplink, at UE 120b, a transmit processor 264 may receive and process data (e.g., for the physical uplink shared channel (PUSCH) or the physical sidelink shared channel (PSSCH)) from a data source 262 and control information (e.g., for the physical uplink control channel (PUCCH) or the physical sidelink control channel (PSCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the UE 120a. At the UE 120a, the sidelink signals from the UE 120a may be received by the antennas 234, processed by the modulators 232, detected by a MIMO detector 236 if applicable, and further processed by a receive processor 238 to obtain decoded data and control information sent by the UE 120b. The receive processor 238 may provide the decoded data to a data sink 239 and the decoded control information to the controller/processor 240.

The memories 242 and 282 may store data and program codes for UE 120a and UE 120b, respectively.

The controller/processor 280 and/or other processors and modules at the UE 120b may perform or direct the execution of processes for the techniques described herein. For example, as shown in FIG. 2, the controller/processor 240 of the UE 120a has a transmit SI on sidelink manager 241 that may be configured for transmitting first system information to a second UE (e.g., UE 120b); for determining, based on one or more first parameters, to transmit second system information to the second UE; for transmitting the second system information in a sidelink system information block (S-SIB) to the second UE; and for communicating with the second UE via sidelink resources determined based on the first system information and the second system information, according to aspects described herein. As shown in FIG. 2, the controller/processor 280 of the UE 120b has a receive SI on sidelink manager 241 that may be configured for receiving first system information from a second UE; for determining, based on one or more first parameters, to receive second system information from the second UE; for receiving the second system information in a sidelink system information block (S-SIB) from the second UE; and for communicating with the second UE via sidelink resources determined based on the first system information and the second system information, according to aspects described herein. Although shown at the Controller/Processor, other components of the UE 120a and UE 120b may be used performing the operations described herein.

Figure 3:
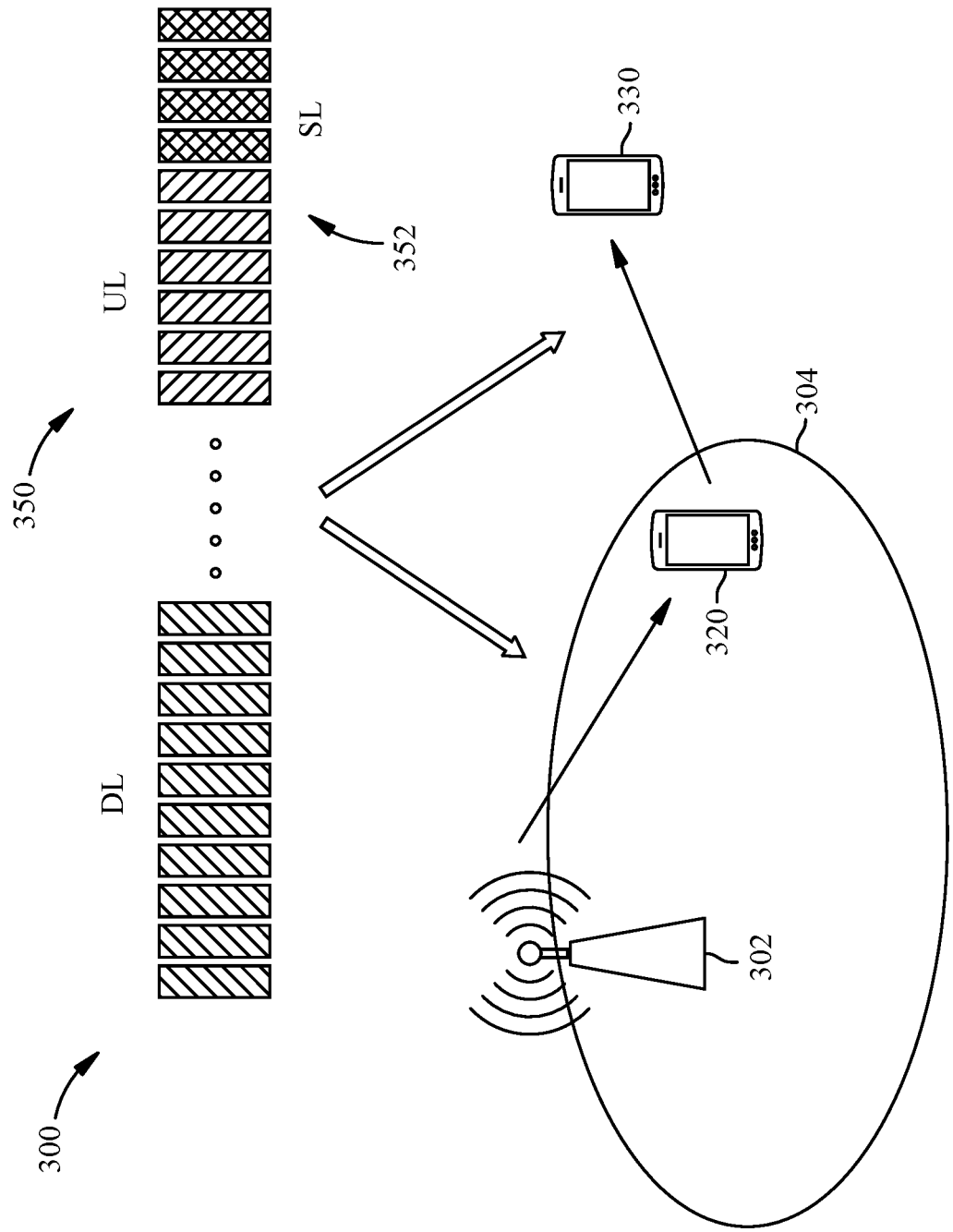
FIG. 3 shows an exemplary communication system 300 illustrating partial coverage in sidelink communication, according to aspects of the present disclosure.

FIG. 3 shows an exemplary communication system 300 illustrating partial coverage in sidelink communication, according to aspects of the present disclosure. In the exemplary communication system, a UE 320 is in coverage (InC) of a cell 304 served by a base station 302 (e.g., a gNB). A UE 330 is out of coverage (OoC) of the cell 304, but the UE 330 is synchronized to the BS 302, because UE 330 is indirectly synchronized to BS 302 via the UE 320. In the exemplary communication system, the UE 330 may not be allowed to use an arbitrary resource although it is OoC, in order to avoid potential interference of transmissions by UE 330 to cellular reception by UE 320. Therefore, TDD UL/DL configuration or other information (e.g., sidelink resource pool) may be needed by UE 330. UE 320 can send that information and/or configuration to UE 330, according to aspects of the present disclosure. Thus, if the communications system uses TDD and allocates a portion 352 of uplink resources 350 to sidelink transmissions, then it would be desirable for the UE 330 to obtain information on that allocation, but the UE 330 cannot receive it from the BS 302 because the UE 330 is OoC of the BS 302.

Accordingly, techniques and apparatus for transmitting system information on sidelink are desirable.

Example Transmission of System Information on Sidelink

Aspects of the present disclosure provide techniques for transmission of system information from a first UE to a second UE via a sidelink transmission. The SI transmission via a sidelink may occur as a two-step transmission (i.e., two separate transmissions and receptions).

In aspects of the present disclosure, the first transmission contains the first system information (e.g., a sidelink master information block (S-MIB)), and the second transmission contains the second system information (e.g., a sidelink system information block (S-SIB)).

Figure 4:
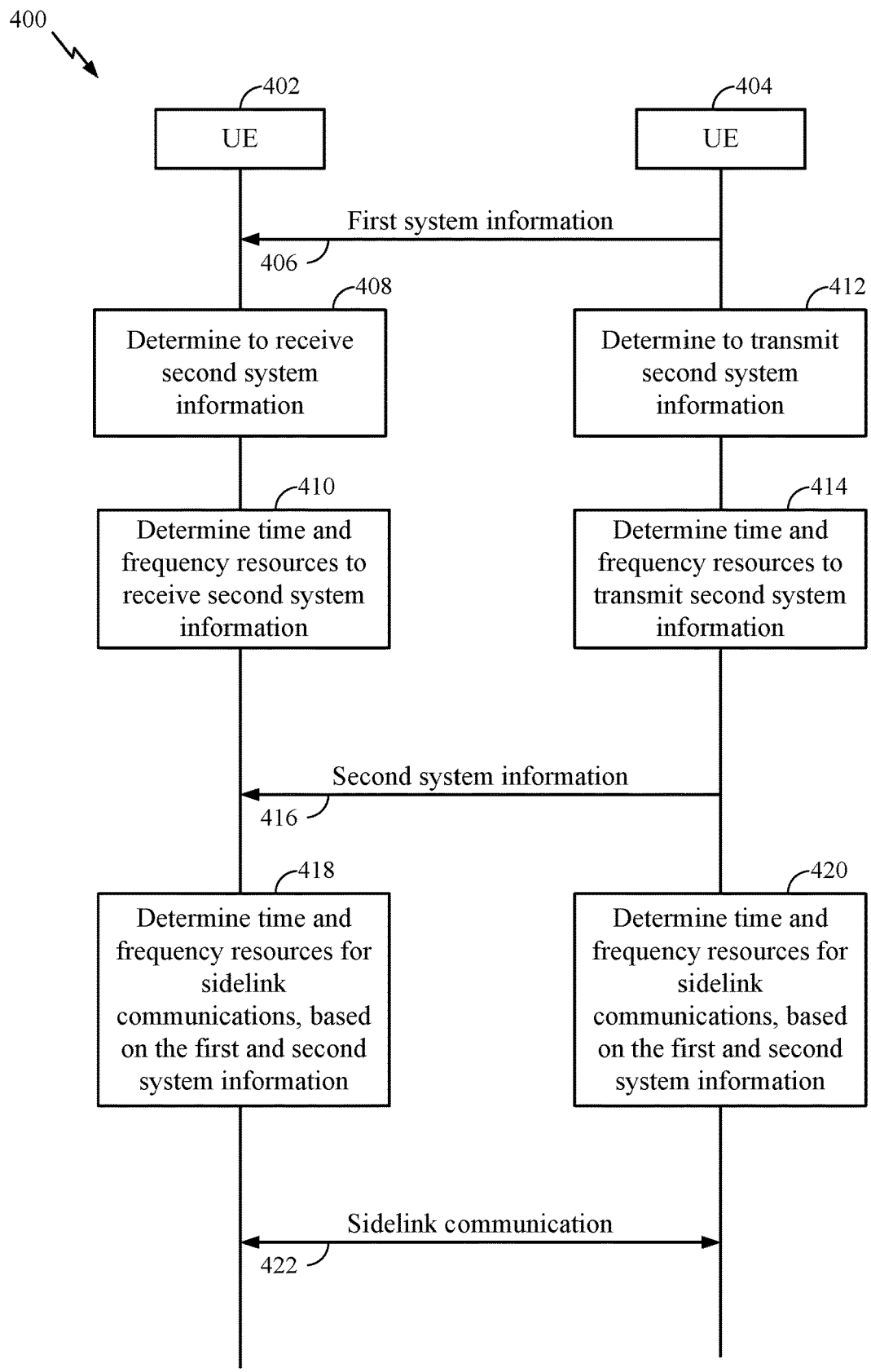
FIG. 4 is a call flow diagram illustrating example signaling for transmitting system information on sidelink, in accordance with certain aspects of the present disclosure.

FIG. 4 is an exemplary call flow 400 of transmitting system information on sidelink, according to aspects of the present disclosure. In the exemplary call flow, a first UE 402 receives first system information (e.g., in a sidelink master information block (S-MIB)) from a second UE 404 at 406. At 408, the first UE determines to receive second system information. The first UE then determines time and frequency resources to receive the second system information at 410. Meanwhile, the second UE determines to transmit the second system information at 412, and at 414, the second UE determines time and frequency resources to transmit the second system information. At 418, the second UE transmits the second system information via the resources determined at 414, and the first UE receives the second system information on the resources determined at 410. At 418, the first UE determines time and frequency resources for sidelink communications, based on the first and second system information. The second UE determines time and frequency resource for sidelink communications, based on the first and second system information, at 420. At 422, the first UE and the second UE communicate via sidelink on the determined time and frequency resources.

According to aspects of the present disclosure, the S-SIB carries one or more of a TDD UL/DL configuration, a sidelink resource pool (i.e., time and/or frequency resources allocated for sidelink communications), and a bandwidth part (BWP) for sidelink communication.

In aspects of the present disclosure, the first transmission implies or indicates a set of resources for the second transmission.

According to aspects of the present disclosure, the second transmission may be optional, i.e., not all UEs communicating on sidelink are required to transmit and/or receive second system information (e.g., an S-SIB).

In aspects of the present disclosure, a UE receiving system information on a sidelink receives a first system information (e.g., in an S-MIB), then the UE determines whether to receive second system information (e.g., in an S-SIB). The UE receives the second system information, if the determination is to receive the second system information, based on the first system information.

According to aspects of the present disclosure, the UE communicates with other UEs on sidelink based at least on the first and second system information. For example, the UE may determine a sidelink resource configuration(s) based on the first and second system information.

In aspects of the present disclosure, the first system information may indicate or imply the presence of the second system information. That is, an indicator in the first system information may directly indicate that another UE has or will transmit the second system information, or a parameter in the first system information may imply that another UE has or will transmit the second system information.

In aspects of the present disclosure, a UE receives the second system information when presence of the second system information is indicated or implied by first system information. For example, an S-MIB includes a parameter that indicates the presence of an S-SIB, or an S-MIB includes a parameter that implies the presence of an S-SIB. In another example, an S-MIB includes a parameter indicating the system is TDD, and then a UE determines to receive S-SIB based on the system being TDD, i.e., the UE will not receive the S-SIB if the system is not TDD (for instance, the system is FDD, or, sidelink communication is deployed on unlicensed spectrum or spectrum for Intelligent Transportation Systems, etc.). In yet another example, an S-MIB includes a parameter indicating or implying the synchronization source on sidelink is a gNB, then the UE determines to receive the S-SIB, i.e., the UE will not receive the S-SIB if the synchronization source is not a gNB but some other synchronization source, such as a global navigation satellite system (GNSS) or a UE. In still another example, the first system information may be conveyed by a sidelink synchronization signal block (S-SSB) that conveys an S-MIB, and information in the S-SSB that is not in the S-MIB implies the presence of S-SIB. For example, an S-SSB transmitted by a UE implies or indicates that the synchronization source on sidelink is a gNB (i.e., not GNSS or the UE), but the coverage status of a UE receiving the S-SSB is out of coverage, so the receiving UE receives the S-SIB to communicate via sidelink with the transmitting UE. This is similar to the partial coverage scenario described above with reference to FIG. 3.

According to aspects of the present disclosure, a UE may determine whether to receive second system information based on one or more of the following factors (i.e., the UE determines whether to receive based on information at the UE's and not the indication of an S-MIB):

(1) the frequency band deploying sidelink: for example, the UE receives second system information if sidelink communications are using licensed spectrum (TDD or FDD, or supplemental uplink (SUL)), otherwise the UE does not receive the second system information when sidelink communications are not using licensed spectrum, such as intelligent transport systems (ITS) spectrum or unlicensed spectrum. In another example, the UE may determine to receive second system information if sidelink communications are using licensed TDD spectrum, but not to receive the second system information if the sidelink communications are using any other spectrum.

(2) status of a timer at the UE: for example, the UE previously received the second system information, and started a timer to determine whether the received second system information is expired. The UE receives the second system information if the status of the timer is expired, but otherwise the UE does not receive the second system information.

In aspects of the present disclosure, the UE determines to receive second system information when the UE successfully decodes the first system information, i.e., receiving of the second system information is mandatory for the UE when the UE successfully decodes the first system information. For example, a network standard requires the two types of system information to always be transmitted together, so a UE decoding the first system information determines to attempt to receive the second system information.

According to aspects of the present disclosure, a UE that has determined to receive second system information may determine a time resource (e.g., a slot) to receive the second system information.

In aspects of the present disclosure, a UE that has determined to receive second system information may determine that there is a window (e.g., a set of consecutive slots) to receive the second system information and then attempt to receive the second system information using a time resource occurring during the window. The size of the window may, for example, be pre-configured or be determined based on a received configuration (e.g., received in first system information), subcarrier spacing, or some other parameter.

According to aspects of the present disclosure, the first system information may include one or more parameter(s) indicating a time resource (e.g., a slot) to receive the second system information, and a UE that has determined to receive the second system information determines when to receive the second system information based on the indication in the first system information. For example, first system information indicates a specific slot to receive the second system information, and a UE receiving the first system information determines the specific slot to receive the second system information based on the indication in the first system information.

In aspects of the present disclosure, there is a configured, pre-configured, pre-defined, and/or pre-determined parameter indicating the time resource (e.g., a slot) to receive the second system information, and a UE that has determined to receive the second system information determines a time resource to receive the second system information based on the parameter.

Figure 5:
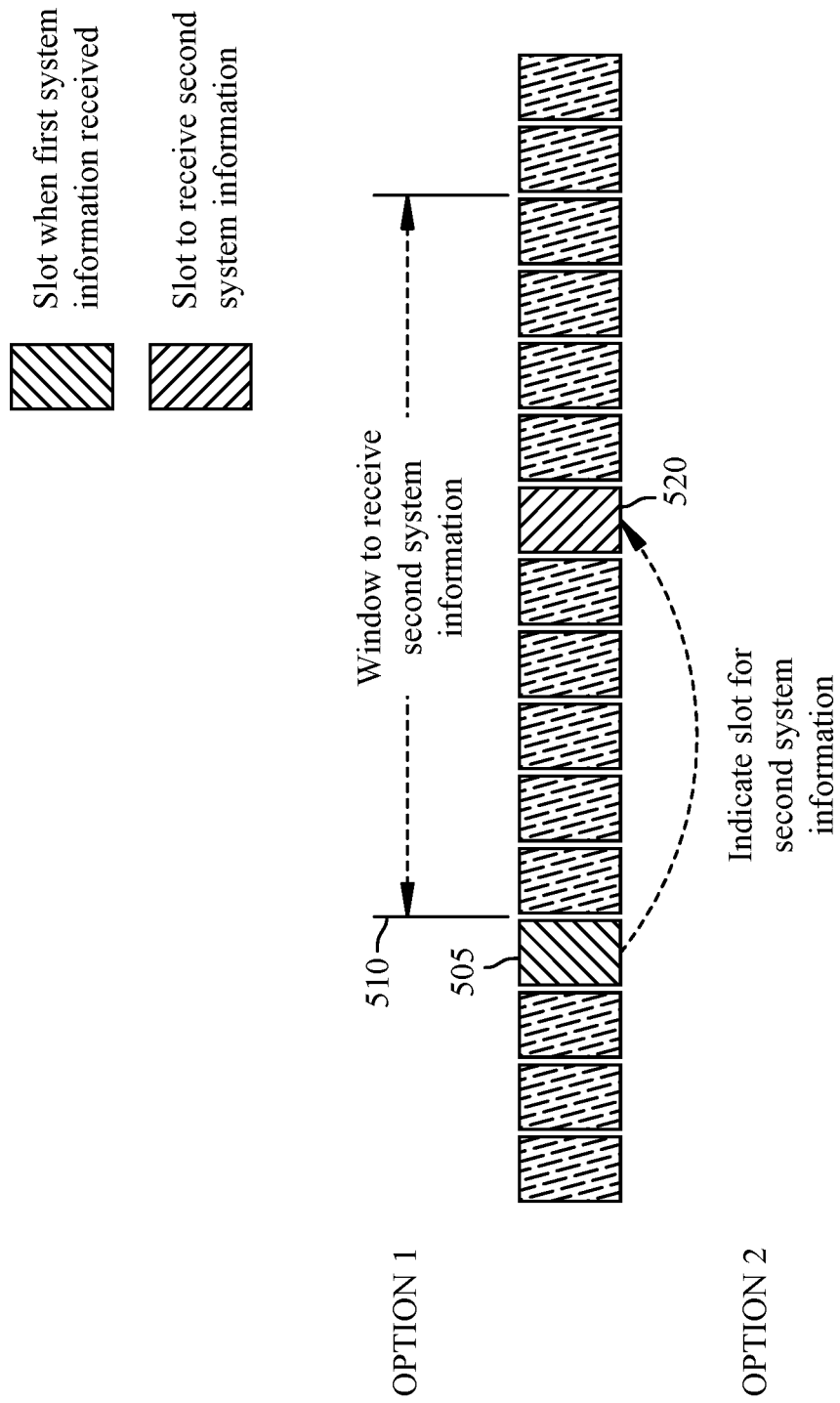
FIG. 5 is an exemplary timeline illustrating use of a window to receive second system information and use of a parameter indicating a time resource for receiving second system information, in accordance with certain aspects of the present disclosure.

FIG. 5 is an exemplary timeline 500 illustrating use of a window to receive second system information and use of a parameter, k, indicating a time resource for receiving second system information, according to aspects of the present disclosure. First system information is received in an S-MIB by a UE at 505. In one example, the UE attempts to receive second system information in an S-SIB during a time resource occurring during an exemplary window 510. The length of the window may be determined by a parameter. In another example, a parameter, k, indicates that the second system information comes in an S-SIB in a slot (n+k) at 520, when the first system information comes in slot n. In the example, the parameter k≥0.

In aspects of the present disclosure, a UE that has determined to receive second system information determines frequency resources (e.g., resource blocks (RBs)) on which to receive the second system information.

According to aspects of the present disclosure, first system information may have one or more parameters indicating the frequency resources to receive the second system information, and the UE that has determined to receive the second system information may determine the frequency resources to receive the second system information based on the one or more parameters.

In aspects of the present disclosure, the frequency resources used to receive first system information implies the frequency resources to receive the second system information.

According to aspects of the present disclosure, the frequency resources used to receive first system information implies a number of frequency resources may be used to receive the second system information, and the UE that has determined to receive the second system information receives in the implied frequency resources, e.g., by blind decoding signals received in each of the implied frequency resources.

Figure 6:
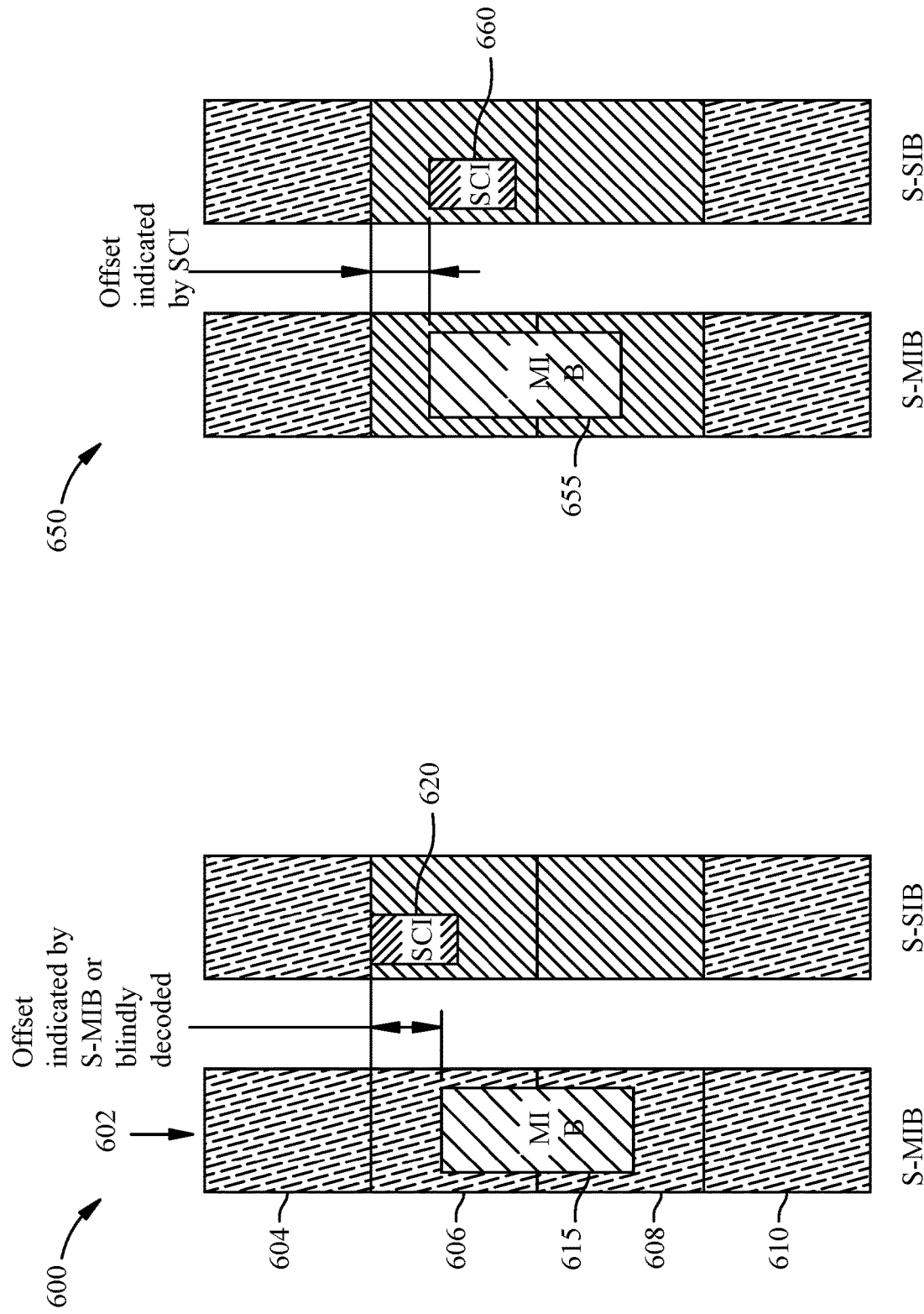
FIGS. 6A & 6B illustrate exemplary frequency allocations for transmission of an S-SIB via a physical sidelink shared channel (PSSCH), in accordance with certain aspects of the present disclosure.

FIGS. 6A & 6B illustrate exemplary frequency allocations 600 and 650 for transmission of an S-SIB via a physical sidelink shared channel (PSSCH), according to aspects of the present disclosure. In the frequency allocation 600, a sidelink bandwidth 602 is divided into four sub-channels, 604, 606, 608, and 610, each of which contains multiple RBs. During a first period (e.g., a slot), a UE receives a PSBCH 615 containing an S-MIB. In one example, in a later period, the receiving UE blindly decodes PSCCH 620 (i.e., tries a few offsets with respect to the S-MIB starting RB) to receive the PSCCH containing the sidelink control information (SCI) that indicates the frequency resources allocated for the PSSCH conveying the S-SIB. In a second example, in the later period, the S-MIB indicates an offset of the PSCCH 620 starting RB with respect to the S-MIB starting RB, and the PSCCH contains SCI indicating the frequency resources allocated for the PSSCH conveying the S-SIB. In the frequency allocation 650, an SCI 660 in a second period has a same starting position as an S-MIB in a first period. The SCI indicates a starting position of a PSSCH conveying S-SIB in the second period as an offset from the starting position of the S-MIB 655.

Figure 7:
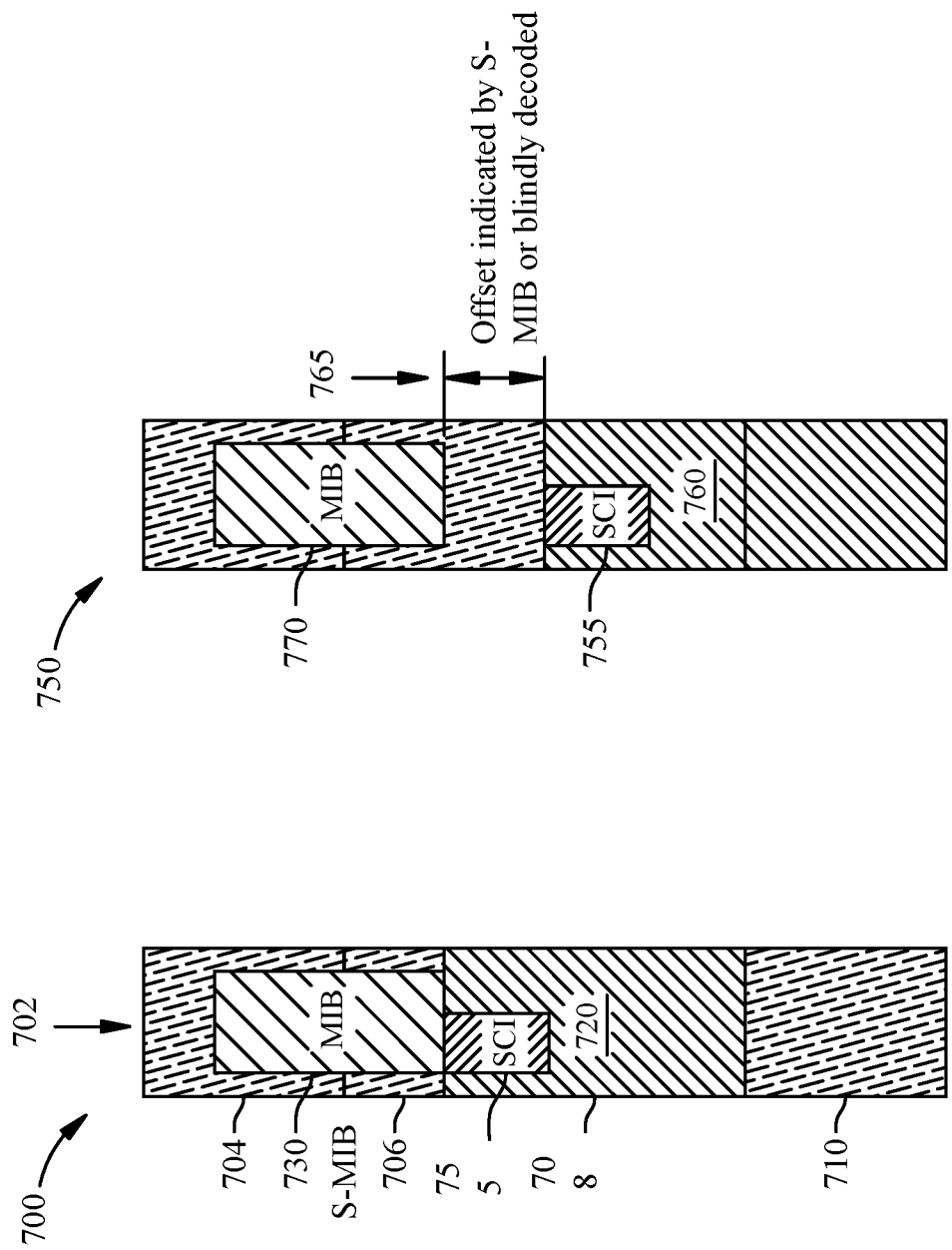
FIG. 7 illustrates an exemplary frequency allocation for transmission of an S-SIB via a PSSCH, in accordance with certain aspects of the present disclosure.

FIG. 7 illustrates exemplary frequency allocations 700 and 750 for transmission of an S-SIB via a PSSCH, according to aspects of the present disclosure. In the frequency allocation 700, a sidelink bandwidth 702 is divided into four sub-channels, 704, 706, 708, and 710, each of which contains multiple RBs. In the frequency allocations 700 and 750, the S-SIB is sent in a same period (e.g., a same slot) as the S-MIB. In the frequency allocation 700, the PSCCH conveying the SCI 715 indicating the frequency allocation of the PSSCH conveying the S-SIB 720 is adjacent to the frequency allocation for the S-MIB 730. A UE receiving the S-MIB 730 may determine the frequency location of the PSCCH conveying the SCI 715 as being adjacent to the frequency location of the PSBCH conveying the S-MIB 730. In the frequency allocation 750, the PSCCH conveying the SCI 755 indicating the frequency allocation of the PSSCH conveying the S-SIB 760 is located at an offset 765 from the frequency location of the PSBCH conveying the S-MIB 770. The MIB 770 may convey an indication of that offset 765. Alternatively, a receiving UE may determine the offset by blindly decoding to find the PSCCH conveying the SCI 755.

According to aspects of the present disclosure, transmitting the S-MIB and S-SIB in a same period (e.g., a same slot) may conserve transmission resources as compared to transmitting the S-MIB and the S-SIB in different periods, as portions of a period conveying an S-MIB may not be available for any other transmissions (e.g., sidelink transmissions cannot be made because system information in the S-SIB has not been transmitted).

In aspects of the present disclosure, the slot (e.g., a time resource) used for transmission of an S-MIB may be included in an S-SIB window. Thus, an offset of k=0 may indicate that the S-MIB and S-SIB are transmitted in a same slot, as illustrated in FIG. 7.

According to aspects of the present disclosure, it may be mandatory (e.g., defined in a network communications standard) that S-MIB and S-SIB be transmitted in a same slot.

In aspects of the present disclosure, an S-MIB may indicate a slot for S-SIB transmission, e.g., by including a time offset that indicates the slot of the S-SIB transmission, counting from and including the slot for the S-MIB transmission. That is, the S-MIB may indicate time offset of zero, which indicates the S-SIB is transmitted in the same slot as the S-MIB.

According to aspects of the present disclosure, a frequency location of a PSCCH conveying an allocation (e.g., an SCI) for an S-SIB may be adjacent to a frequency location of a PSBCH conveying an S-MIB, and a receiving UE determines a frequency location to decode the PSCCH conveying the allocation of the S-SIB based on the frequency location of the PSBCH conveying the S-MIB.

In aspects of the present disclosure, an offset to a frequency location of a PSCCH conveying an allocation (e.g., an SCI) for an S-SIB may be indicated by an S-MIB (e.g., as shown in frequency allocation 750 in FIG. 7).

According to aspects of the present disclosure, an offset to a frequency location of a PSCCH conveying an allocation (e.g., an SCI) for an S-SIB may be determined by a UE receiving an S-MIB and blindly decoding the PSCCH conveying the allocation for the S-SIB. The UE may start from a location indicated by the S-MIB.

In aspects of the present disclosure, the first system information is carried by an S-MIB transmitted on a physical sidelink broadcast channel (PSBCH), and the second system information is carried by an S-SIB transmitted on a physical sidelink shared channel (PSSCH).

According to aspects of the present disclosure, the second system information may have parameters indicating one or more of:

(1) TDD UL/DL configuration;
(2) Sidelink slots configuration, which indicates the slots allocated for sidelink communication;
(3) Sidelink bandwidth part, which indicates the frequency band (RBs) allocated for sidelink communication; and
(4) Sidelink resource pool, which indicates both time and frequency resources allocated for sidelink communication.

In aspects of the present disclosure, the first and second system information may be transmitted periodically.

According to aspects of the present disclosure, the first and second system information may be transmitted with a same periodicity, however, repetition within a period may be different. For example, the second system information may be repeated less often than the first system information. In this example, the periodicity is 160 ms, a number of transmission occasions of first system information within a period is $L_1$, and a number of transmission occasions of second system information within a period is $L_2$. In this example, $L_1$ is configurable (e.g., based on carrier frequency range), but $L_2$ is fixed. That is, $L_1$ may be configured to any of 2, 4, 8, 64, etc., but $L_2$ is fixed at 2. In another example, both $L_1$ and $L_2$ are fixed for a given carrier frequency range, e.g., $L_1=L_2=2$ if carrier frequency of the communications system is less than 6 GHz.

In aspects of the present disclosure, both $L_1$ and $L_2$ are configurable. They may be determined based on carrier frequency range, whether a communications system uses TDD or FDD, or other parameters.

Figure 8:
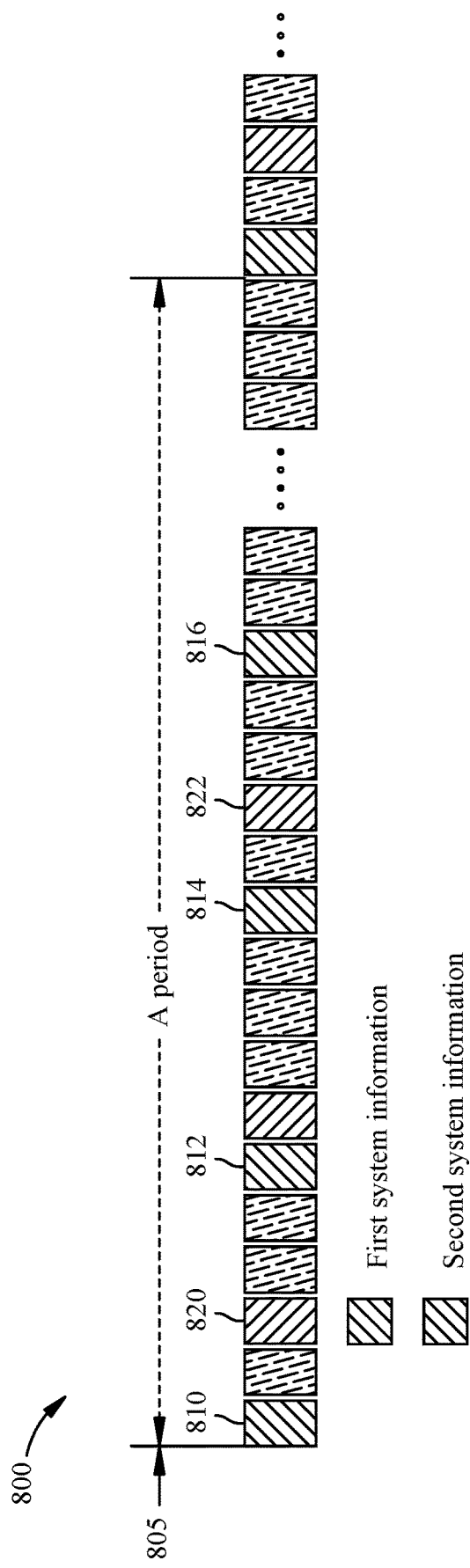
FIG. 8 is an exemplary timeline showing periodic transmissions of first system information and second system information, in accordance with certain aspects of the present disclosure.

FIG. 8 is an exemplary timeline 800 showing periodic transmissions of first system information and second system information when $L_1 \neq L_2$, according to aspects of the present disclosure. In the exemplary timeline, transmission of first system information and second system information are both done periodically, with the period shown at 805. Also in the exemplary timeline $L_1=4$, and thus first system information is transmitted at 810, 812, 814, and 816. In the exemplary timeline, $L_2=2$, and thus second system information is transmitted at 820 and 822.

Figure 9:
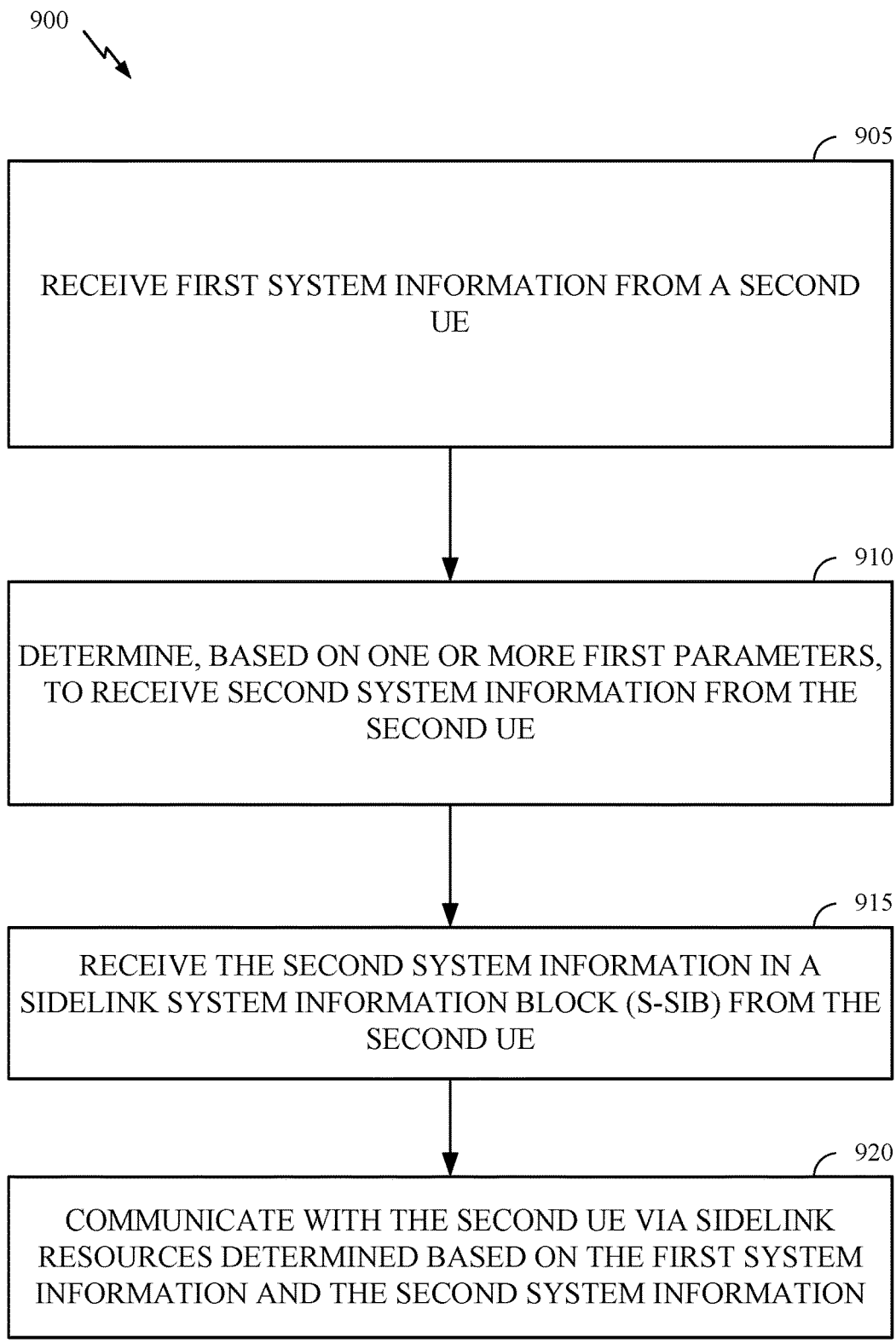
FIG. 9 is a flow diagram illustrating example operations for receiving system information on sidelink, in accordance with aspects of the present disclosure.

FIG. 9 is a flow diagram illustrating example operations 900 for wireless communication, in accordance with certain aspects of the present disclosure. The operations 900 may be performed, for example, by a first UE (e.g., such as a UE 120b in the wireless communication network 100). Operations 900 may be implemented as software components that are executed and run on one or more processors (e.g., controller/processor 280 of FIG. 2). Further, the transmission and reception of signals by the first UE in operations 900 may be enabled, for example, by one or more antennas (e.g., antennas 252 of FIG. 2). In certain aspects, the transmission and/or reception of signals by the first UE may be implemented via a bus interface of one or more processors (e.g., controller/processor 280) obtaining and/or outputting signals.

The operations 900 may begin, at block 905, by a first UE receiving first system information from a second UE. For example, the UE 330 of FIG. 5 receives first system information from the UE 320. In the example, the UE 330 (i.e., the first UE) may be out of coverage (OoC) and thus may rely on obtaining the first system information (e.g., for configuration) from UE 320 (i.e., the second UE). The configuration may include a TDD UL/DL configuration, or other information such as a sidelink resource pool. The configuration may enable the first UE to avoid potential interference of its own transmission even though the first UE may be OoC. In some aspects, the first system information may include a sidelink master information block (S-MIB).

At block 910, operations 900 may continue with the first UE determining, based on one or more first parameters, to receive second system information from the second UE. Continuing the example, as further discussed below, UE 330 determines, based on one or more first parameters, to receive second system information from UE 320. In the example, the one or more first parameters may indicate or imply a presence of a sidelink secondary information block (S-SIB).

Operations 900 may continue at block 915 with the first UE receiving the second system information in a sidelink system information block (S-SIB) from the second UE. Continuing the example, UE 330 receives the second system information in an S-SIB from the second UE. In some instances, the first UE may receive the second system information based on the one or more first parameters of the first system information. In other instances, the first UE may determine whether to receive the second system information based on the frequency band deploying the sidelink between the first UE and the second UE, or based on a timer operating in accordance to a previously received second system information. In some other instances, the first UE may determine to receive the second system information upon successfully decoding the first system information (e.g., when S-MIB and S-SIB are transmitted together).

At block 920, operations 900 may continue with the first UE communicating with the second UE via sidelink resources determined based on the first system information and the second system information. Continuing the example, UE 330 communicating with UE 320 via sidelink resources determined based on the first system information (received in block 905) and the second system information (received in block 915). In an example, the sidelink resources may include one or more sub-channels (frequency resources) and one or more time slots (e.g., time resources). In some aspects, the first UE may determine one or more time slots to receive the second system information. As further discussed below, the UE may determine the time slots (e.g., time resources) based on a time window or a parameter indicating a time resource for receiving the second system information. The parameter may be a configured or predefined parameter.

In aspects of the present disclosure, a UE (e.g., UE 120a in FIG. 1) may transmit first system information (e.g., in an S-MIB), determine whether to transmit second system information (e.g., in an S-SIB), transmit the second system information if the determination is to transmit it, and then communicate with one or more other UEs on sidelink based at least on the first and second system information (e.g., the UE determines sidelink resource configurations based on the first and second system information).

According to aspects of the present disclosure, before transmitting the first and/or second system information, the UE may receive third system information, where the third system information is sent by a gNB or another UE; and the third system information indicates or implies at least one of the following:

(1) whether to send second system information; i.e., the third system information has control signaling indicating the UE to send second system information or the content of the third system information implies whether to send second system information, e.g., when the third system information configures time and/or frequency resources for sidelink communication, that implies that the UE is to send the second system information;

(2) time and/or frequency resources to use to transmit the second system information (time/frequency resource); and (3) one or more parameters carried by the second system information, e.g., transmitting second system information by the UE is forwarding of all or part of the third system information received from a gNB, such as the sidelink resource configuration mentioned above.

In aspects of the present disclosure, a UE may determine to transmit second system information based on a synchronization priority on sidelink of the UE. That is, the UE has information regarding its own synchronization priority and determines to transmit second system information based on that synchronization priority. The UE's synchronization priority may be associated to its S-SSB or S-MIB transmission. When performing sidelink synchronization, a UE determines its synchronization priority, and the UE transmits second system information only if the UE has higher synchronization priority than a threshold synchronization priority to transmit second system information. For example, a base station has the highest synchronization priority (priority level 1), a UE directly synchronized to a base station has the second highest synchronization priority (priority level 2), a UE directly synchronized to a UE that is directly synchronized to a base station has the next highest synchronization priority (priority level 3), etc.

A UE may be configured to transmit second system information only if its synchronization priority is equal to or higher than level 2. In another example, a synchronization priority of a UE may be indicated by a hop counter from an original synchronization source as follows: if the UE is directly synchronized to a base station, then the UE has hop counter equal to 1; if the UE is synchronized to another UE which has hop counter 1 (i.e., the other UE directly synchronized to a base station), then the UE has hop counter equal to 2, etc. In this example, the smaller the hop counter a UE has, the higher the synchronization priority that UE has. In yet another example, a UE transmits second system information only if the UE has a synchronization hop counter equal to 1 (i.e., only UEs directly synchronized to base station(s) transmit second system information). In still another example, a UE transmits second system information if the UE has a synchronization hop counter that is smaller than a threshold $n_{hop}$, which has a (pre-)configured or pre-determined value.

According to aspects of the present disclosure, a UE performing operations 900 may receive the first system information (i.e., in block 905) via a sidelink master information block (S-MIB). In aspects of the present disclosure, the S-MIB may be conveyed via a physical sidelink broadcast channel (PSBCH).

In aspects of the present disclosure, the first system information received by a UE performing operations 900 may include a first parameter of the one or more first parameters that implicitly indicates the second UE will transmit or has transmitted the S-SIB. According to aspects of the present disclosure, the first parameter may indicate the second UE uses a time-division duplex (TDD) communication system. Additionally or alternatively the first parameter may indicate that a synchronization source for the second UE is a base station (BS).

In aspects of the present disclosure, the first system information received by a UE performing operations 900 may be conveyed in a sidelink synchronization signal block (S-SSB).

According to aspects of the present disclosure, the one or more first parameters of block 910 in operations 900 may include a frequency band used by the second UE for transmitting the first system information.

In aspects of the present disclosure, the one or more first parameters of block 910 in operations 900 may include an elapsed time since the first UE previously received another second system information. According to aspects of the present disclosure, the other second system information may have been received from a base station (BS). Alternatively, the other second system information may have been received from the second UE.

In aspects of the present disclosure, the one or more first parameters of block 910 in operations 900 may include an indication that the first UE decoded the first system information.

According to aspects of the present disclosure, a UE performing operations 900 may determine a time resource (e.g., a slot) to receive the S-SIB and receive the S-SIB at the determined time. In aspects of the present disclosure, the time resource may occur during a window (e.g., as illustrated in FIG. 5), and the UE may determine a size of the window. According to aspects of the present disclosure, determining the size of the window may include determining the size of the window based on subcarrier spacing used by the second UE to transmit the first system information. In aspects of the present disclosure, the first system information may include one or more second parameters and the UE may determine the time based on the one or more second parameters. According to aspects of the present disclosure, the time may occur a predetermined period after the UE receives the first system information.

In aspects of the present disclosure, a UE performing operations 900 may determine a frequency resource to receive the S-SIB (i.e., the S-SIB received in block 915). According to aspects of the present disclosure, the first system information may include one or more second parameters and the UE may determine the frequency resource to receive the S-SIB based on the one or more second parameters. In aspects of the present disclosure, a UE performing operations 900 may determine the frequency resource to receive the S-SIB based on a frequency used to transmit the first system information. Alternatively or additionally, a UE performing operations 900 may determine the frequency resource to receive the S-SIB by determining a plurality of frequency resources and performing blind decoding to receive the second system information in the plurality of frequency resources.

According to aspects of the present disclosure, a UE performing operations 900 may receive the S-SIB in a physical sidelink shared channel (PSSCH).

In aspects of the present disclosure, the second system information received in block 915 may include a time-division duplex (TDD) uplink/downlink (UL/DL) configuration for sidelink communications, a sidelink slots configuration indicating slots allocated for sidelink communications, a sidelink bandwidth part indicating a frequency band allocated for sidelink communication, and/or a sidelink resource pool indicating a set of time and frequency resources allocated for sidelink communication.

According to aspects of the present disclosure, the first system information in block 905 may be transmitted by the second UE at a first periodicity, and the second system information may be transmitted by the second UE at a second periodicity (e.g., as illustrated in FIG. 8).

Figure 10:
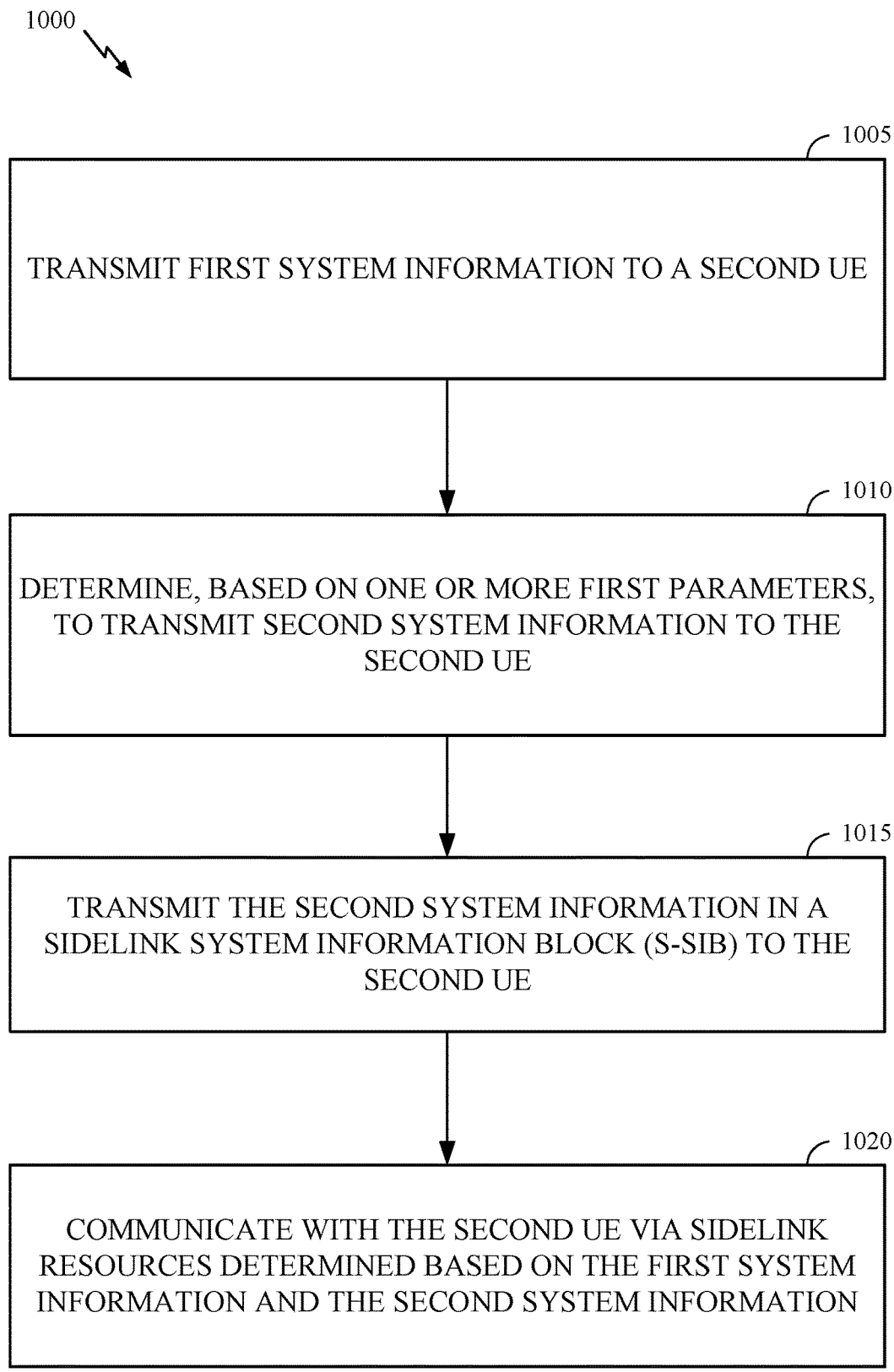
FIG. 10 is a flow diagram illustrating example operations for transmitting system information on sidelink, in accordance with aspects of the present disclosure.

FIG. 10 is a flow diagram illustrating example operations 1000 for wireless communication, in accordance with certain aspects of the present disclosure. The operations 1000 may be performed, for example, by a first UE (e.g., such as the UE 120a in the wireless communication network 100). The operations 1000 may be complimentary operations by the first UE to the operations 900 performed by the UE described with reference to FIG. 9, above. For example, the operations 1000 may be performed by a UE transmitting system information (SI) via a sidelink, and a UE performing operations 900 may receive the SI via the sidelink from the UE performing operations 1000.

Operations 1000 may be implemented as software components that are executed and run on one or more processors (e.g., controller/processor 240 of FIG. 2). Further, the transmission and reception of signals by the first UE in operations 1000 may be enabled, for example, by one or more antennas (e.g., antennas 234 of FIG. 2). In certain aspects, the transmission and/or reception of signals by the first UE may be implemented via a bus interface of one or more processors (e.g., controller/processor 240) obtaining and/or outputting signals.

The operations 1000 may begin, at block 1005, with the first UE transmitting first system information to a second UE. For example, the UE 320 of FIG. 5 transmits first system information to UE 330. In the example, the UE 320 may be in coverage and able to transmit the first system information for configuration of the UE 330. Like in operations 900, the configuration may include TDD UL/DL configuration or other information such as a sidelink resource pool. In some aspects, the first system information may include a sidelink master information block (S-MIB).

Operations 1000 may continue, at block 1010, with the first UE determining, based on one or more first parameters, to transmit second system information to the second UE. Continuing the example, UE 320 determines, based on one or more first parameters, to transmit second system information to UE 330. For example, UE 320 may make the determination before transmitting the first system information, or after transmitting the first system information but before transmitting the second system information to UE 330. In another example, UE 320 may receive third system information sent by a network device (e.g., a gNB or another UE) indicating specifications regarding transmitting the second system information. The specifications may include (1) whether to send the second system information, (2) resources to use for sending second system information, such as any relevant time or frequency resources, and (3) parameters carried by the second system information, as further described in various aspects below.

At block 1015, operations 1000 may continue with the first UE transmitting the second system information in a sidelink system information block (S-SIB) to the second UE. Continuing the example, UE 320 transmits the second system information in an S-SIB to UE 330. In some examples, the first UE may transmit the second system information that uses the one or more first parameters of the first system information. In other examples, the first UE may transmit the second system information in response to requests sent from the second UE, which determines whether to receive the second system information based on the frequency band deploying the sidelink between the first UE and the second UE, or based on a timer operating in accordance to a previously received second system information. In some other examples, the second UE may determine to receive the second system information upon successfully decoding the first system information (e.g., when S-MIB and S-SIB are transmitted together).

Operations 1000 may continue, at block 1020, with the first UE communicating with the second UE via sidelink resources determined based on the first system information and the second system information. Continuing the example, UE 320 communicates with UE 330 via sidelink resources determined based on the first system information (transmitted at block 1005) and the second system information (transmitted at block 1015). In the example, UE 320 may determine sidelink resource configurations based on the first system information and the second system information.

In aspects of the present disclosure, an S-SIB may be carried by a PSSCH, and an allocation of a set of time and frequency resources for the PSSCH may be indicated by a PSCCH.

According to aspects of the present disclosure, an S-SIB time location may be determined from an S-MIB time location.

In aspects of the present disclosure, an S-SIB may be transmitted in a window of length N (e.g., 10) slots after transmission of an S-MIB. A UE receiving the S-MIB may try to decode an S-SIB during the window.

According to aspects of the present disclosure, an S-MIB may include a parameter indicating a slot (e.g., a time resource) carrying an S-SIB. A UE receiving the S-MIB may then receive the S-SIB in the indicated slot.

In aspects of the present disclosure, an S-MIB may indicate a window or a slot to receive an S-SIB, due to uncertainty of a TDD UL/DL pattern making it impractical to use a predetermined slot for transmission of an S-SIB.

In aspects of the present disclosure, an S-SIB contains system information from a cellular communication system for sidelink communications with a UE operating in that cellular communication system. Thus, a UE may be able to transmit and receive on sidelink after receiving the S-SIB.

According to aspects of the present disclosure, S-SIB transmission and reception may be optional for some sidelink communications. For example, receiving an S-SIB may not be needed for sidelink communications in ITS or unlicensed spectrum.

In aspects of the present disclosure, whether an S-SIB has or will be transmitted may be indicated by an S-MIB.

According to aspects of the present disclosure, other configurations may be contained in an S-SIB.

In aspects of the present disclosure, a BWP configuration for SL communications may be included in an S-SIB. Such a BWP configuration may be used for SL communications when the SL communications share licensed spectrum, and for ITS or unlicensed spectrum, a UE may use a default pre-configuration instead of a BWP configuration included in an S-SIB.

According to aspects of the present disclosure, a wireless communications network may use transmission of system information via sidelink communications (e.g., transmission of SI in an S-MIB and/or an S-SIB) to act as a UE-to-network relay.

In aspects of the present disclosure, a UE performing operations 1000 may receive third system information from a base station (BS) or a third UE, wherein the third system information includes the one or more first parameters (i.e., the first parameters of block 1010). According to aspects of the present disclosure, the third system information may include an indication of time or frequency resources to be used for transmitting the second system information (i.e., block 1015). In aspects of the present disclosure, the third system information may include a portion of the second system information.

According to aspects of the present disclosure, a UE performing operations 1000 may transmit the first system information via a sidelink master information block (S-MIB). In aspects of the present disclosure, the UE may transmit the S-MIB via a physical sidelink broadcast channel (PSBCH).

In aspects of the present disclosure, the first system information may include a first parameter of the one or more first parameters that implicitly indicates the first UE will transmit or has transmitted the S-SIB. According to aspects of the present disclosure, the first parameter may indicate the first UE uses a time-division duplex (TDD) communication system. In aspects of the present disclosure, the first parameter may indicate that a synchronization source for the first UE is a base station (BS).

According to aspects of the present disclosure, a UE performing operations 1000 may transmit the first system information in a sidelink synchronization signal block (S-SSB).

In aspects of the present disclosure, the one or more first parameters of block 1010 may include a frequency band used by the first UE for transmitting the first system information.

According to aspects of the present disclosure, the one or more first parameters of block 1010 may include an elapsed time since the first UE previously transmitted another second system information.

In aspects of the present disclosure, a UE performing operations 1000 may determine a time resource (e.g., a slot) to transmit the S-SIB and transmit the S-SIB using the determined time resource. According to aspects of the present disclosure, the time resource may occur during a window (e.g., as illustrated in FIG. 8), and the UE may determine a size of the window. In aspects of the present disclosure, determining the size of the window may include determining the size of the window based on subcarrier spacing used by the first UE to transmit the first system information. Additionally or alternatively, the first system information may include one or more second parameters and the UE may determine the time resource based on the one or more second parameters. Additionally or alternatively, the UE may determine the time resource as occurring a predetermined period after transmitting the first system information (e.g., as illustrated in FIG. 5).

According to aspects of the present disclosure, a UE performing operations 1000 may determine a frequency resource to transmit the S-SIB (i.e., the S-SIB in block 1015). In aspects of the present disclosure, the first system information may include one or more second parameters and the UE may determine the frequency resource based on the one or more second parameters. Additionally or alternatively, the UE may determine the frequency resource based on a frequency used to transmit the first system information.

In aspects of the present disclosure, a UE performing operations 1000 may transmit the S-SIB in a physical sidelink shared channel (PSSCH).

According to aspects of the present disclosure, the second system information may include a time-division duplex (TDD) uplink/downlink (UL/DL) configuration for sidelink communications, a sidelink slots configuration indicating slots allocated for sidelink communications, a sidelink bandwidth part indicating a frequency band allocated for sidelink communication, and/or a sidelink resource pool indicating a set of time and frequency resources allocated for sidelink communication.

In aspects of the present disclosure, a UE performing operations 1000 may transmit the first system information at a first periodicity and transmit the second system information at a second periodicity (e.g., as illustrated in FIG. 8).

According to aspects of the present disclosure, a UE performing operations 1000 may determine its own synchronization priority and determine to transmit the second system information (i.e., as described in block 1010) based on at least the synchronization priority of the first UE.

Figure 11:
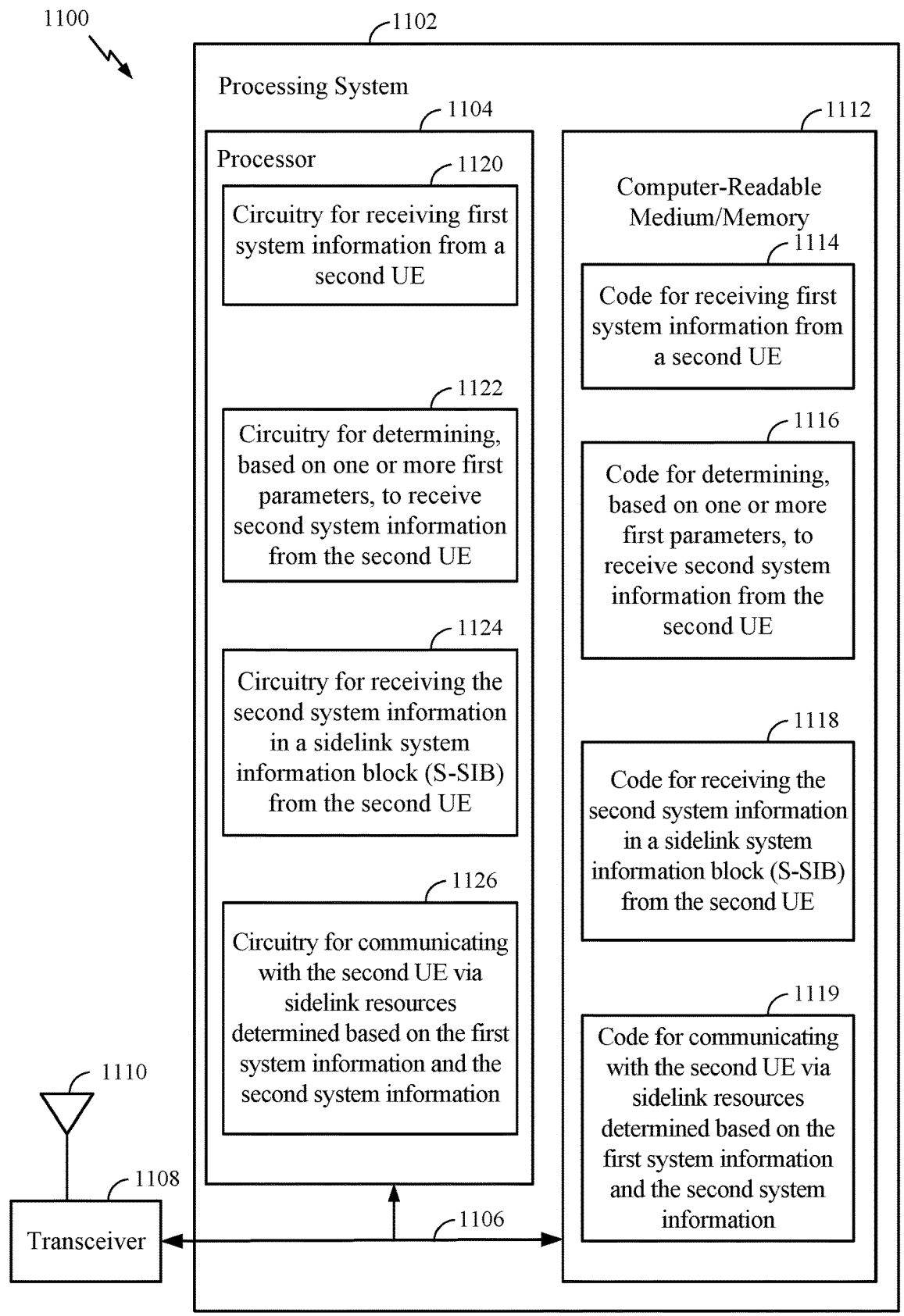
FIG. 11 illustrates a communications device that may include various components configured to perform operations for receiving system information on sidelink, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for transmitting system information on sidelink. In certain aspects, computer-readable medium/memory 1112 stores code 1114 for receiving first system information from a second UE; code 1116 for determining, based on one or more first parameters, to receive second system information from the second UE, code 1118 for receiving the second system information in a sidelink system information block (S-SIB) from the second UE, and code 1119 for communicating with the second UE via sidelink resources determined based on the first system information and the second system information. In certain aspects, the processor 1104 has circuitry configured to implement the code stored in the computer-readable medium/memory 1112. The processor 1104 includes circuitry 1120 for receiving first system information from a second UE; circuitry 1122 for determining, based on one or more first parameters, to receive second system information from the second UE, circuitry 1124 for receiving the second system information in a sidelink system information block (S-SIB) from the second UE, and circuitry 1126 for communicating with the second UE via sidelink resources determined based on the first system information and the second system information.

Figure 12:
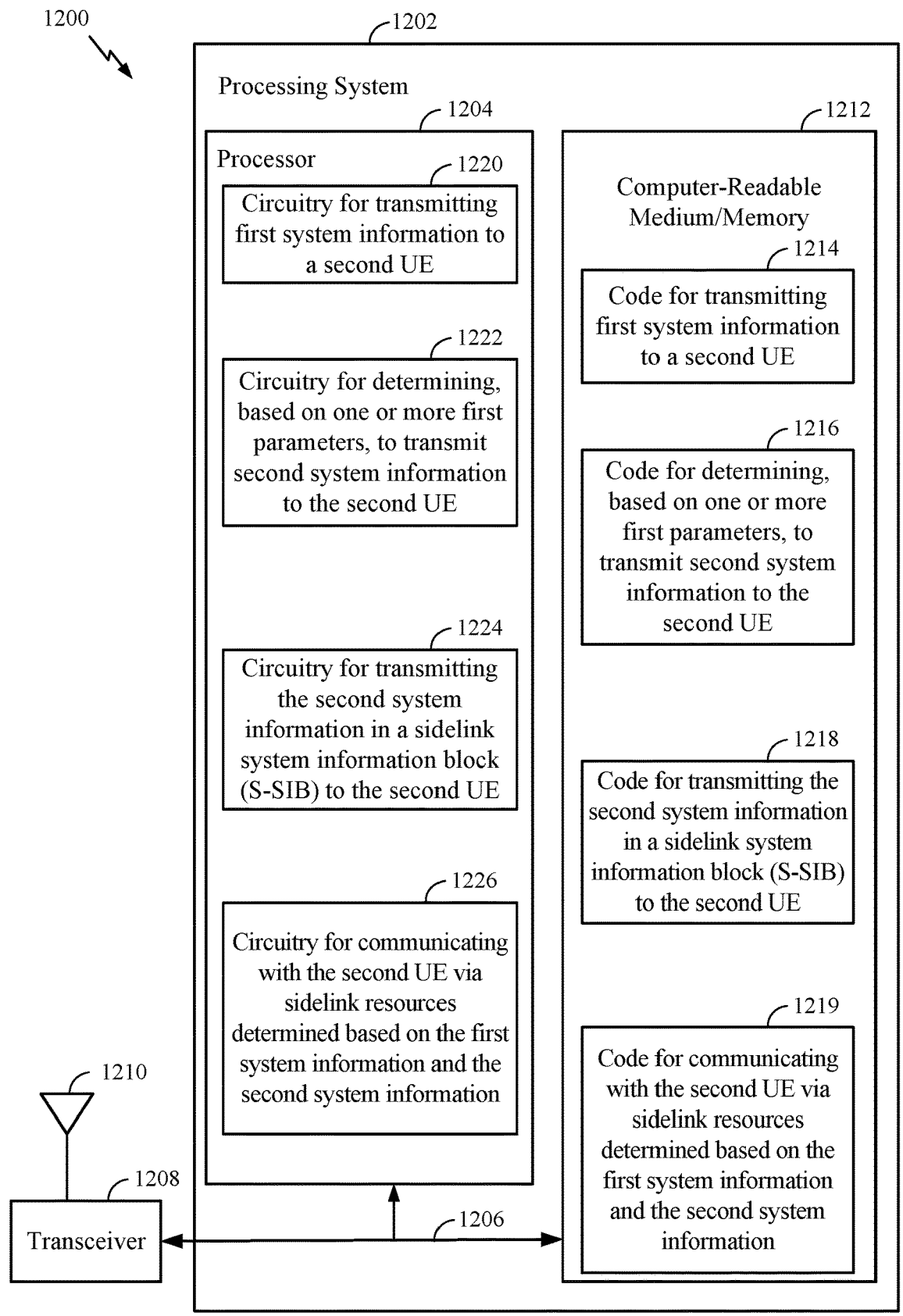
FIG. 12 illustrates a communications device that may include various components configured to perform operations for transmitting system information on sidelink, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for transmitting system information on sidelink. In certain aspects, computer-readable medium/memory 1212 stores code 1214 for transmitting first system information to a second UE; code 1216 for determining, based on one or more first parameters, to transmit second system information to the second UE, code 1218 for transmitting the second system information in a sidelink system information block (S-SIB) to the second UE, and code 1219 for communicating with the second UE via sidelink resources determined based on the first system information and the second system information. In certain aspects, the processor 1204 has circuitry configured to implement the code stored in the computer-readable medium/memory 1212. The processor 1204 includes circuitry 1220 for transmitting first system information to a second UE; circuitry 1222 for determining, based on one or more first parameters, to transmit second system information to the second UE, circuitry 1224 for transmitting the second system information in a sidelink system information block (S-SIB) to the second UE, and circuitry 1226 for communicating with the second UE via sidelink resources determined based on the first system information and the second system information.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The terms "first" and "second" (and "third" and so on) are used to describe elements in the order they appear in certain examples, embodiments, or contexts. The terms "first" and "second," and other such language indicating an order of appearance, do not provide specific technical characterization unless particularly designated or classified herein. For example, a first device and a second device may refer to two devices that are mentioned in such order. When described in another context or in another example, the "second device" as initially referred to may be described as a "first device" in the other context or the other example. Such designation allows each context or example to include self-contained description without reliance on other contexts or examples described herein.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a first user equipment (UE), comprising:
receiving first system information from a second UE;
determining, based on one or more first parameters, to receive second system information from the second UE;
receiving the second system information in a sidelink system information block (S-SIB) from the second UE, wherein the first system information comprises a first parameter of the one or more first parameters that implicitly indicates the second UE will transmit or has transmitted the S-SIB and wherein the first parameter indicates at least one of:
the second UE uses a time division duplex (TDD) communication system; or
a synchronization source for the second UE is a base station (BS); and
communicating with the second UE via sidelink resources determined based on the first system information and the second system information.

2. The method of claim 1, wherein the first system information is conveyed via a sidelink master information block (S-MIB), the S-MIB conveyed via a physical sidelink broadcast channel (PSBCH).

3. A method for wireless communications performed by a first user equipment (UE), comprising:
receiving first system information from a second UE;
determining, based on one or more first parameters, to receive second system information from the second UE, wherein the one or more first parameters comprise an elapsed time since the first UE previously received another second system information;
receiving the second system information in a sidelink system information block (S-SIB) from the second UE; and
communicating with the second UE via sidelink resources determined based on the first system information and the second system information.

4. The method of claim 1, further comprising determining a time resource to receive the S-SIB, wherein the first UE receives the S-SIB using the determined time resource.

5. The method of claim 4, wherein the time resource occurs during a window, and the method further comprises determining a size of the window.

6. The method of claim 5, wherein the first system information comprises one or more second parameters and the time is determined based on the one or more second parameters.

7. The method of claim 5, wherein the time occurs a predetermined period after receiving the first system information.

8. The method of claim 1, further comprising determining a frequency resource to receive the S-SIB, wherein the first system information comprises one or more second parameters and the frequency resource is determined based on the one or more second parameters.

9. The method of claim 1, further comprising determining a frequency resource to receive the S-SIB, wherein the frequency resource is determined based on a frequency used to transmit the first system information.

10. The method of claim 1, further comprising determining a frequency resource to receive the S-SIB, wherein determining the frequency resource comprises:
determining a plurality of frequency resources; and
performing blind decoding to receive the second system information in the plurality of frequency resources.

11. The method of claim 1, wherein the second system information includes at least one of a time-division duplex (TDD) uplink/downlink (UL/DL) configuration for sidelink communications, a sidelink slots configuration indicating slots allocated for sidelink communications, a sidelink bandwidth part indicating a frequency band allocated for sidelink communication, and a sidelink resource pool indicating a set of time and frequency resources allocated for sidelink communication.

12. The method of claim 1, wherein:
the first system information is transmitted by the second UE at a first periodicity; and
the second system information is transmitted by the second UE at a second periodicity.

13. A method for wireless communications performed by a first user equipment (UE), comprising:
transmitting first system information to a second UE;
determining, based on one or more first parameters, to transmit second system information to the second UE;
transmitting the second system information in a sidelink system information block (S-SIB) to the second UE, wherein the first system information comprises a first parameter of the one or more first parameters that implicitly indicates the first UE will transmit or has transmitted the S-SIB, and wherein the first parameter indicates that a synchronization source for the first UE is a base station (BS); and
communicating with the second UE via sidelink resources determined based on the first system information and the second system information.

14. The method of claim 13, further comprising:
receiving third system information from a base station (BS) or a third UE, wherein the third system information includes at least one of:
the one or more first parameters; or
an indication of time or frequency resources to be used for transmitting the second system information.

15. The method of claim 13, wherein the first system information is conveyed via a sidelink master information block (S-MIB), the S-MIB being conveyed via a physical sidelink broadcast channel (PSBCH).

16. The method of claim 13, wherein the one or more first parameters comprise a frequency band used by the first UE for transmitting the first system information.

17. A method for wireless communications performed by a first user equipment (UE), comprising:
transmitting first system information to a second UE;
determining, based on one or more first parameters, to transmit second system information to the second UE, wherein the one or more first parameters comprise an elapsed time since the first UE previously transmitted another second system information;
transmitting the second system information in a sidelink system information block (S-SIB) to the second UE, and
communicating with the second UE via sidelink resources determined based on the first system information and the second system information.

18. The method of claim 13, further comprising determining a time resource for transmitting the S-SIB, wherein the first UE transmits the S-SIB using the determined time resource, wherein the time resource occurs during a window, and the method further comprises determining a size of the window.

19. The method of claim 13, further comprising determining a time to transmit the S-SIB, wherein the first UE transmits the S-SIB at the determined time, wherein the first system information comprises one or more second parameters and the time is determined based on the one or more second parameters.

20. The method of claim 13, further comprising determining a time to transmit the S-SIB, wherein the first UE transmits the S-SIB at the determined time, wherein the time occurs a predetermined period after transmitting the first system information.

21. The method of claim 13, further comprising determining a frequency resource to transmit the S-SIB, wherein the first system information comprises one or more second parameters and the frequency resource is determined based on the one or more second parameters.

22. The method of claim 13, further comprising determining a frequency resource to transmit the S-SIB, wherein the frequency resource is determined based on a frequency used to transmit the first system information.

23. The method of claim 13, wherein the S-SIB is conveyed in a physical sidelink shared channel (PSSCH).

24. The method of claim 13, wherein the second system information includes at least one of a time-division duplex (TDD) uplink/downlink (UL/DL) configuration for sidelink communications, a sidelink slots configuration indicating slots allocated for sidelink communications, a sidelink bandwidth part indicating a frequency band allocated for sidelink communication, and a sidelink resource pool indicating a set of time and frequency resources allocated for sidelink communication.

25. The method of claim 13, wherein:
the first system information is transmitted by the first UE at a first periodicity; and
the second system information is transmitted by the first UE at a second periodicity.

26. The method of claim 13, further comprising:
determining a synchronization priority of the first UE; and
determining to transmit the second system information based on at least the synchronization priority of the first UE.

27. A first apparatus for wireless communications comprising:
a processor configured to:
receive first system information from a user equipment (UE);
determine, based on one or more first parameters, to receive second system information from the UE;
receive the second system information in a sidelink system information block (S-SIB) from the UE, wherein the first system information comprises a first parameter of the one or more first parameters that implicitly indicates the second UE will transmit or has transmitted the S-SIB and wherein the first parameter indicates at least one of:
the second UE uses a time division duplex (TDD) communication system;
or
a synchronization source for the second UE is a base station (BS); and
communicate with the UE using sidelink resources determined based on the first system information and the second system information; and
a memory coupled with the processor.

28. A first apparatus for wireless communications comprising:
a processor configured to:
transmit first system information to a user equipment (UE);
determine, based on one or more first parameters, to transmit second system information to the UE;
transmit the second system information in a sidelink system information block (S-SIB) to the UE, wherein the first system information comprises a first parameter of the one or more first parameters that implicitly indicates the first UE will transmit or has transmitted the S-SIB, and wherein the first parameter indicates that a synchronization source for the first UE is a base station (BS); and
communicate with the UE via sidelink resources determined based on the first system information and the second system information; and
a memory coupled with the processor.

29. The method of claim 3, wherein the one or more first parameters comprise a frequency band used by the second UE for transmitting the first system information.

30. The method of claim 17, wherein the one or more first parameters comprise a frequency band used by the first UE for transmitting the first system information.

31. A first apparatus for wireless communications comprising:
a processor configured to:
receive first system information from a second user equipment (UE);
determine, based on one or more first parameters, to receive second system information from the second UE, wherein the one or more first parameters comprise an elapsed time since the first UE previously received another second system information;
receive the second system information in a sidelink system information block (S-SIB) from the second UE; and
communicate with the second UE via sidelink resources determined based on the first system information and the second system information; and
a memory coupled with the processor.

32. A first apparatus for wireless communications comprising:
a processor configured to:
transmit first system information to a second user equipment (UE);
determine, based on one or more first parameters, to transmit second system information to the second UE, wherein the one or more first parameters comprise an elapsed time since the first UE previously transmitted another second system information;
transmit the second system information in a sidelink system information block (S-SIB) to the second UE; and
communicate with the second UE via sidelink resources determined based on the first system information and the second system information; and
a memory coupled with the processor.

* * * * *